United States Patent [19]
Scott

[11] Patent Number: 5,669,412
[45] Date of Patent: Sep. 23, 1997

[54] TWO-PIECE CHECK VALVE ASSEMBLY

[75] Inventor: Daniel G. Scott, Pittsburgh, Pa.

[73] Assignee: Westinghouse Air Brake Company, Wilmerding, Pa.

[21] Appl. No.: 585,839

[22] Filed: Jan. 16, 1996

[51] Int. Cl.⁶ ................................................. F16K 15/00
[52] U.S. Cl. ........................... 137/533.31; 137/533.21; 137/543.21
[58] Field of Search ................... 137/533.21, 533.25, 137/533.31, 543.21

[56] References Cited

U.S. PATENT DOCUMENTS

| | | | |
|---|---|---|---|
| 654,552 | 7/1900 | Morris | 137/543.21 |
| 718,771 | 1/1903 | Kerfoot | 137/533.31 |
| 1,912,786 | 6/1933 | Moe | 137/533.31 |
| 1,913,664 | 6/1933 | Finger | 137/543.21 |
| 3,548,868 | 12/1970 | Mullaney III | 137/543.21 |

*Primary Examiner*—Denise L. Ferensic
*Assistant Examiner*—Ramyar M. Farid
*Attorney, Agent, or Firm*—Gary J. Falace

[57] ABSTRACT

A two-piece check valve device comprising a rubber sealing element and a plastic carrier member. A through bore in the plastic carrier member receives the sealing element, which is formed with an annular groove in which the carrier member is removably secured. The through bore and annular groove may be correspondingly tapered to facilitate assembly and disassembly of the check valve device.

15 Claims, 2 Drawing Sheets

TWO-PIECE CHECK VALVE ASSEMBLY

BACKGROUND OF THE INVENTION

The present invention relates to check valves and particularly to poppet type check valves such as are typically employed in pneumatic brake control valve devices for railroad vehicles.

Poppet type check valves generally comprise a valve element that moves perpendicularly relative to a seat to open and close a fluid conducting passageway in which the valve element and seat are situated. When used as a backflow check, the valve element is arranged to disengage its valve seat in response to fluid flow in a desired direction and to engage its valve seat in response to fluid flow in the opposite direction. Alternatively, a piston actuator may be employed to operate the check valve element in a direction to engage or disengage its valve seat.

One such poppet type check valve known in the prior art is shown in FIGS. 1 and 2 of the drawings and is commonly employed in the aforementioned pneumatic brake control valve devices. The valve element A of such poppet type check valves is typically made from a rubber compound that is bonded during a molding process to a stamped metal insert B to form a unitary valve structure. The metal insert gives rigidity to the rubber valve element and provides a fluted guide C that is adapted to engage the passageway in which the check valve is disposed. The flutes are designed to permit fluid to pass around the solid molded structure and to maintain proper alignment of the valve element with its seat.

In the manufacture of these insert-molded, unitary poppet type check valves, difficulty is encountered not only in the molding process itself, but also in the after-molding process of removing flashing produced during the molding operation. In addition, such a unitary valve structure requires replacement of the entire check valve, including the metal insert, when the rubber valve element becomes worn.

SUMMARY OF THE INVENTION

It is therefore an object of the present invention to provide a new, poppet type check valve device that is simple to manufacture and low in cost.

It is an extension of the foregoing to provide a check valve device that requires no bonding of the rubber valve element to a metal insert or the like.

Another object of the invention is to provide a two-piece check valve that permits replacement of either piece independently of the other.

Still another object of the invention is to employ a plastic carrier with which the rubber valve seal element is arranged in a two-piece assembly.

These objectives are carried out by means of a two-piece, snap-together check valve device that permits individual molding of the separate check valve components, which makes a simpler, less costly molding operation, such as injection molding, possible. The rubber valve seal element is designed to be retained in a separate plastic carrier member so that it can be removed therefrom and replaced when worn. The carrier member has a through bore in which the rubber seal element is removably secured by engagement with an annular groove in the body of the seal element. The carrier member has a fluted periphery that guidably positions the check valve device in its passageway without cocking, in order to ensure the integrity of the check valve seal when engaged with its seat and to permit passage of fluid around the periphery of the check valve. The ability to individually mold the separate check valve components affords greater design latitude and consequently enhances the cost effectiveness of the check valve device according to the present invention.

BRIEF DESCRIPTION OF THE DRAWINGS

Other objects and advantages of the present invention will become apparent from the following more detailed explanation when taken in connection with the accompanying drawings in which.

DESCRIPTION AND OPERATION

In each of the various embodiments herein disclosed, there is provided a segmented check valve device 10 comprising a rubber seal element 12 and a plastic carrier member 14, for which a glass-filled nylon is the preferred material.

Figure 1:
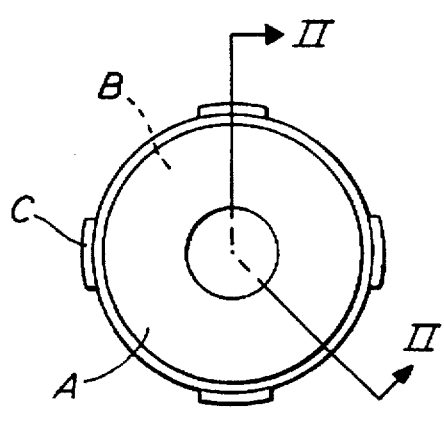
FIGS. 1 and 2 are top and sectional elevation views respectively of a molded type unitary check valve device known in the prior art.
Figure 3:
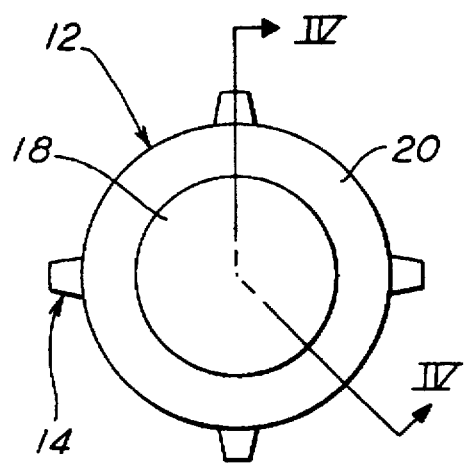
FIGS. 3 and 4 are top and sectional elevation views respectively of a preferred embodiment of a poppet type check valve device featuring a snap-together plastic check valve assembly in accordance with the present invention.
Figure 4:
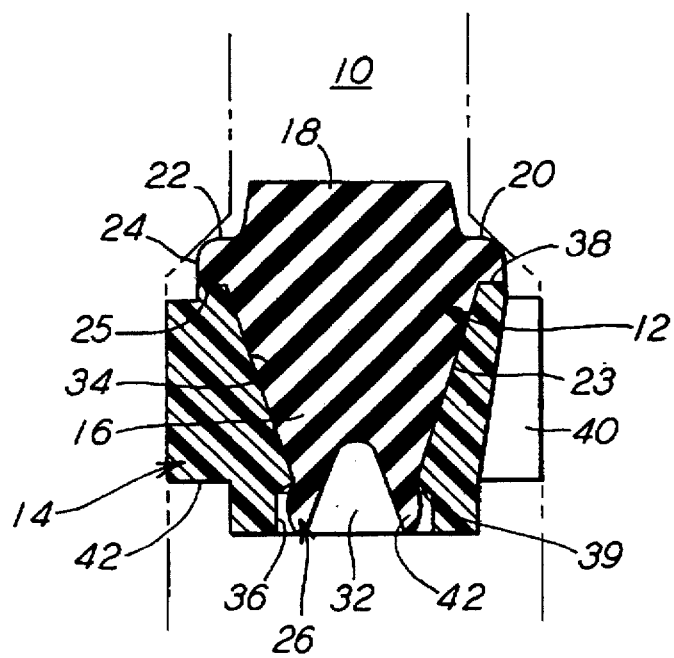

In the preferred embodiment of the invention, as shown in FIGS. 3 and 4, seal element 12 is formed by a rubber body portion 16 having a head 18, an annular shoulder 20 that extends laterally from head 18, and a bulbous shaped bottom end 26. The upper surface 22 of shoulder 20 provides a sealing area with which a valve seat (shown in phantom) of a poppet valve assembly is engageable. In the case of the tapered style seat represented, the sealing area is generally the edge of shoulder 20 between the upper surface 22 and its periphery 24.

Formed in the periphery of body portion 16 between the underside 25 of shoulder 20 and bulbous bottom end 26 is an annular groove 23 in which carrier member 14 is retained. The base of groove 23 is tapered such that the diameter is smaller at bulbous end 26 than at shoulder 20. The bulbous end 26 of body portion 16 has an opening 32 that extends inwardly a distance at least beyond bulbous end 26 to provide flexure of bulbous end 26 in order to facilitate insertion of seal element 12 into carrier member 14 and subsequent removal therefrom.

Carrier member 14 is formed with a bore 34 and a counterbore 36, bore 34 having a taper conforming to the taper of groove 23 in body portion 16. Seal element 12 is assembled with carrier member 14 by inserting bulbous end 26 of body portion 16 into tapered bore 34, at the larger diameter thereof, until the bulbous end enters counterbore 36. The diameter of bulbous end 26 is greater than the smaller diameter of tapered bore 34, such that the bulbous end flexes inwardly during insertion just before entering counterbore 36, the diameter of which is greater than the diameter of bulbous end 26 to permit the flexed bulbous end to expand to its normal unflexed condition. In this manner, the assembly of seal element 12 with carrier member 14 is fixed or locked by engagement of the underside 25 of shoulder 20 with an upper surface 38 of carrier member 14, and by engagement of bulbous end 26 with a lower surface 39 of carrier member 14 formed by the base of counterbore 36.

The relatively large mass of seal element 12 combined with the relatively large support area of the tapered through bore of carrier member 14 provides such rigidity as to prevent distortion of seal element 12 under load, without requiring a metal insert, as employed for such purpose in the prior art practice. In addition, the taper of through bore 34 accommodates insertion of bulbous end 26 of seal element 12 into carrier member 14 without interference therebetween until the seal element approaches final insertion, thus making assembly easy.

Carrier member 14 is further formed with a fluted periphery 40 that is sized in accordance with the diameter of the passageway in which the check valve device is disposed, in order to provide a guide for alignment of the check valve device with its seat and to permit generally unrestricted flow of air past the guide when the check valve device is unseated during operation. An annular recess 42 in the bottom surface of carrier member 14 provides a seat to accommodate a spring when such is employed to bias the check valve device toward engagement with its seat. In this preferred embodiment of the invention, the shoulder 20 of seal element 12 is absent any support at its periphery, since such design is intended for use with a tapered type seat, as represented by the dot-dashed lines in the drawing. During engagement with seal element 12, the tapered seat tends to laterally contain the seal so as to not require any peripheral support.

In the event seal element 12 becomes worn or damaged, it can be removed from its assembly with carrier member 14 by inserting a blunt nosed tool, for example, into opening 32 with sufficient force to cause bulbous end 26 to flex inwardly and thereby release its locking engagement with the base 39 of counterbore 36. In this manner, the worn or damage seal element may be removed from carrier member 14 and replaced with a new seal element, without requiring replacement of the carrier member.

Figure 2:
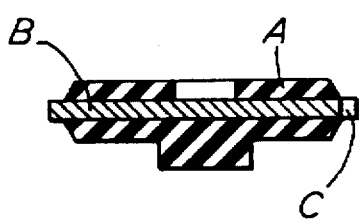
Figure 5:
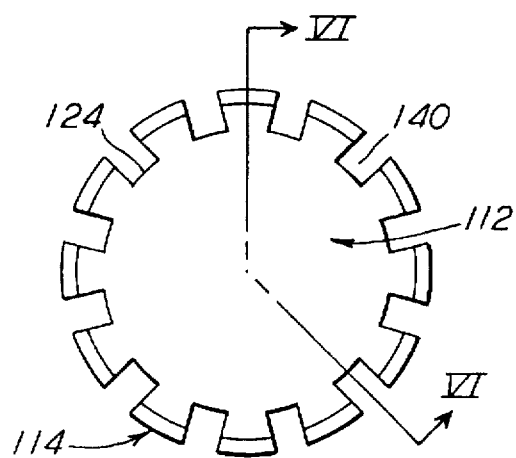
FIGS. 5 and 6 are top and sectional elevation views respectively of an alternate embodiment of a check valve device according to the present invention.
Figure 6:
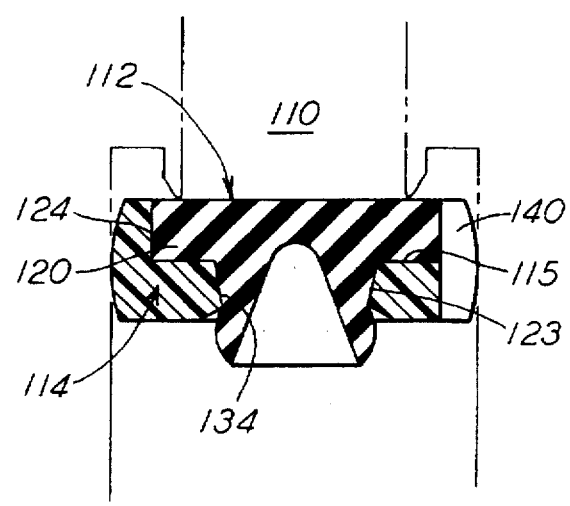

In an alternate embodiment of the invention shown in FIGS. 5 and 6, a check valve device 110 is shown, which is intended for installations requiring a more compact check valve design than the embodiment of FIGS. 2 and 3; and also for such installations in which a vertically disposed valve seat is employed instead of a tapered valve seat as in the embodiment of FIGS. 2 and 3.

Check valve device 110 differs from check valve device 10 in that tapered groove 123 of body portion 112 is shorter in length than groove 23, and the periphery of carrier member 114 is arcuate and surrounds the periphery 124 of shoulder 120. In shortening tapered groove 123 in body portion 112, a more compact design is realized for installations where space limitations exist. In addition, carrier member 114 is formed with a recess 115 in its top surface into which tapered bore 134 opens. When seal element 112 is inserted into carrier member 114, shoulder 120 of seal element 112 is retained within recess 115 such that the periphery of carrier member 114 surrounds the periphery 124 of shoulder 120 in order to prevent lateral displacement and distortion of the seal element during seat engagement. The fluted periphery 140 of carrier member 114 is further shaped arcuately to guide the check valve device 110 in its bore without binding and cocking, as the carrier member of this design is inclined to do because of its relatively thin size and to permit passage of fluid.

Figure 7:
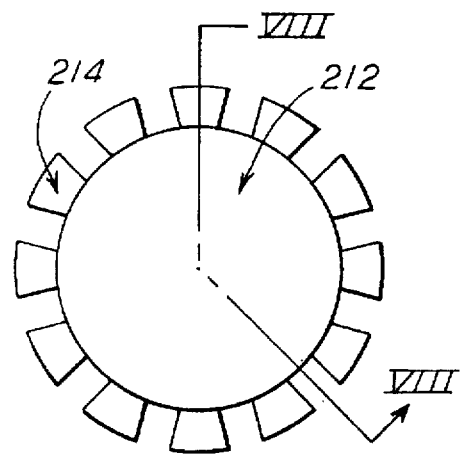
FIGS. 7 and 8 are top and sectional elevation views respectively of another alternate embodiment of a check valve device according to the present invention.
Figure 8:
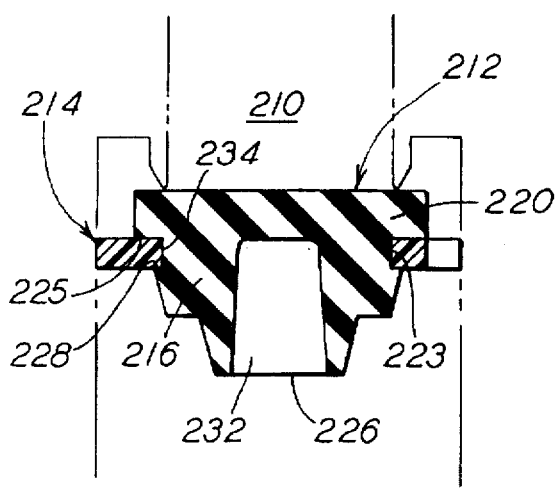

Another alternate embodiment of the invention is shown in FIGS. 7 and 8, in which check valve 210 differs from the previous embodiments by reason of annular groove 223 being non-tapered and by the absence of a bulbous shaped bottom end of seal element 212. In this embodiment, the annular groove 223 in body portion 216 is formed between the underside 225 of shoulder 220 and a spaced-apart, confronting side 228 that is generally parallel to underside 225. As opposed to the tapered annular groove 23, 123 of body portion 12, 112 in the previous embodiments, the periphery of body portion 216 within groove 223 in this embodiment is normal to sides 225 and 228 and is thus not tapered. Neither, therefore, is the correspondingly shaped bore 234 in carrier member 214 tapered. It will be appreciated that a tapered retention area of body portion 212 and correspondingly tapered bore of carrier member 214 are unnecessary in this design, due to the relatively short distance the seal element 212 needs to be inserted to realize locking assembly with the relatively thin carrier member 214.

While the annular groove of body portion 216 is non-tapered, the area between groove 223 and bottom 226 is tapered. The purpose of this taper, in conjunction with the opening 232 in body portion 216 is to ensure sufficient flexure of body portion 216 to facilitate insertion of seal element 212 into carrier member 214 during assembly therewith and subsequent removal therefrom.

I claim:

1. For a poppet valve assembly including a valve seat in a fluid pressure passageway, a check valve device cooperatively arranged relative to said valve seat for establishing and interrupting flow of fluid under pressure in said passageway, said check valve device comprising:

a) an annular carrier member having opposing upper and lower surfaces and a through bore extending therebetween; and b) an elastomeric seal element comprising a body having an annular shoulder extending laterally therefrom at one end of said body, a flexure portion at the other end of said body and an annular groove in the periphery of said body between an underside of said shoulder and a confronting surface of said flexure portion, said upper surface of said carrier member engaging said underside of said shoulder and said lower surface of said carrier member engaging said confronting surface of said flexure portion, said shoulder having an upper surface with which said valve seat is engageable in a seal area having generally opposed relationship with said upper surface of said carrier member.

2. A check valve device as recited in claim 1, further characterized in that the periphery of said body is tapered.

3. A check valve device as recited in claim 2, wherein the diameter of the tapered periphery of said body decreases in a direction from said shoulder to said flexure portion.

4. A check valve device as recited in claim 3, further characterized in that said body further includes an opening in said other end extending into said body at least a distance corresponding to the distance between said other end and said confronting surface of said flexure portion.

5. A check valve device as recited in claim 1, further characterized in that the periphery of said carrier member is fluted.

6. A check valve device as recited in claim 1, wherein said carrier member is plastic.

7. A check valve device as recited in claim 2, wherein the tapered periphery of said body includes said groove.

8. A check valve device as recited in claim 7, wherein said through bore in said carrier member is formed with a taper corresponding to the tapered periphery of said groove.

9. A check valve device as recited in claim 8, further characterized in that said through bore is contiguous with said tapered periphery of said body within said groove.

10. A check valve device as recited in claim 9, wherein said through bore comprises a bore and a counterbore between which is formed said lower surface of said carrier member.

11. A check valve device as recited in claim 10, wherein said flexure portion is formed with a bulbous end in surrounding relationship with said opening, said bulbous end providing said confronting surface of said flexure portion and extending laterally into said counterbore to provide said engagement of said confronting face with said lower surface of said carrier member.

12. A check valve device as recited in claim 1, wherein said carrier member comprises a recess in the upper surface thereof having an annular sidewall, the periphery of said annular shoulder being contiguous with said annular sidewall of said recess.

13. A check valve device as recited in claim 12, wherein the periphery of said carrier member is arcuate.

14. A check valve device as recited in claim 2, wherein the periphery of said body is tapered between said groove and said flexure portion.

15. A check valve device as recited in claim 14, wherein the periphery of said body is non-tapered within said groove.

* * * * *